(12) United States Patent
Sakai

(10) Patent No.: US 7,164,521 B2
(45) Date of Patent: Jan. 16, 2007

(54) ABERRATION COMPENSATING DEVICE AND OPTICAL HEAD DEVICE

(75) Inventor: Hiroshi Sakai, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 12 days.

(21) Appl. No.: 11/172,368

(22) Filed: Jun. 30, 2005

(65) Prior Publication Data
US 2006/0012846 A1    Jan. 19, 2006

(30) Foreign Application Priority Data
Jul. 16, 2004  (JP)  ............... 2004-209933

(51) Int. Cl.
G02F 1/01    (2006.01)
(52) U.S. Cl. .................. 359/279; 359/237; 359/319
(58) Field of Classification Search ........... 359/279, 359/237, 254, 276, 295, 315, 319, 637, 248; 349/17, 25, 57, 200; 369/112, 44.38
See application file for complete search history.

(56) References Cited

U.S. PATENT DOCUMENTS 6,151,154 A * 11/2000 Ogasawara et al. ......... 359/279

FOREIGN PATENT DOCUMENTS

JP    2000-040249    2/2000

* cited by examiner

Primary Examiner—Hung Xuan Dang
Assistant Examiner—Tuyen Tra
(74) Attorney, Agent, or Firm—Hogan & Hartson LLP

(57) ABSTRACT

An aberration compensating device for compensating aberration of a laser beam emitted from a light source and converged on an optical recording disk through an objective lens includes a liquid crystal panel including a liquid crystal layer and transparent electrodes disposed so as to interpose the liquid crystal layer therebetween and a liquid crystal panel control part for controlling an applied voltage which is applied to the transparent electrodes. The transparent electrode includes a center part and a plurality of outer peripheral divided parts divided around the center part. When the diameter of an incident area of the laser beam corresponding to the pupil diameter of the objective lens on the liquid crystal panel is set to be "D1" and the diameter of the center part is set to be "D2", (D2/D1) is set at a value in the range from about 0.5 to about 0.65.

10 Claims, 6 Drawing Sheets

(a)

(b)

ABERRATION COMPENSATING DEVICE AND OPTICAL HEAD DEVICE

FIELD OF THE INVENTION

The present invention relates to an aberration compensating device for compensating aberration generated in an optical system which is used in an optical head device for performing recording or reproduction of information into or from an optical recording disk such as a CD or a DVD (Digital Versatile Disk), and relates to an optical head device provided with the aberration compensating device.

BACKGROUND OF THE INVENTION

In an optical head device for performing recording or reproduction of information into or from an optical recording disk such as a CD or a DVD, it has been conventionally known that the performance of recording and reproduction is deteriorated by the affection of the wave front aberration which is generated due to various factors. An aberration compensating device for compensating the wave front aberration has been proposed, which includes a liquid crystal panel having a liquid crystal layer whose refractive index is changed in accordance with an applied voltage and transparent electrodes disposed so as to interpose the liquid crystal layer therebetween and a liquid crystal panel control part controlling a voltage applied to the transparent electrode. The aberration compensating device compensates the aberration of a laser beam which is emitted from a light source and converged on an optical recording disk through an objective lens.

As an example, an aberration compensating device has been known in which the transparent electrode comprises a center part in an approximately circular shape and outer peripheral divided parts which are divided into eight sections at an approximately equal angle around the center part and disposed so as to surround the center part (see, for example, Japanese Patent Laid-Open No. 2000-40249). In the aberration compensating device, voltages applied to divided areas comprising of the center part and the respective outer peripheral divided parts are controlled corresponding to the direction of the astigmatism of a laser beam passing through the liquid crystal panel. The astigmatism is compensated by applying a phase difference corresponding to the voltage, which is controlled in the respective divided areas, to the laser beam passing through the respective divided areas.

In the aberration compensating device described in Japanese Patent Laid-Open No. 2000-40249, even when astigmatism is generated in various directions in an optical system used in an optical head device, the transparent electrode is provided with the divided areas comprising of the center part and the respective outer peripheral divided parts so as to cope with the direction of the astigmatism, and the phase difference corresponding to the voltage applied to the respective divided areas is applied to the laser beam passing through the respective divided areas. Therefore, the astigmatism whose direction or magnitude is different can be effectively compensated with a simple structure.

However, the compensation of the astigmatism by the conventional aberration compensating device described above is not sufficient, and thus an aberration compensating device having a further enhanced aberration compensating effect is required to ensure the recording and reproduction performance of an optical head device.

SUMMARY OF THE INVENTION

In view of the problems described above, it is an object and advantage of the present invention to provide an aberration compensating device capable of effectively compensating the astigmatism with a simple structure and to provide an optical head device provided with the aberration compensating device.

In order to achieve the above object and advantage, the present inventor has executed various examinations. Especially, various examinations have been executed with attention focused on the relationship between the incident area of a laser beam corresponding to the pupil diameter of an objective lens on a liquid crystal panel and the center part of the transparent electrode. As a result, the present inventor has found that, when a prescribed relationship is provided between the incident area of the laser beam and the center part of the transparent electrode, the astigmatism different in the direction and magnitude generated in the optical system of the optical head device can be effectively compensated.

In accordance with an embodiment of the present invention, there is provided an aberration compensating device for compensating the aberration of a laser beam which is emitted from a light source and converged on an optical recording disk through an objective lens including a liquid crystal panel having a liquid crystal layer whose refractive index is changed in accordance with an applied voltage and transparent electrodes which are disposed so as to interpose the liquid crystal layer therebetween and a liquid crystal panel control part for controlling the applied voltage which is applied to the transparent electrodes. The transparent electrode includes a center part in an approximately circular shape and an outer peripheral part surrounding the center part, and the outer peripheral part includes a plurality of outer peripheral divided parts that are divided around the center part. Further, when the diameter of an incident area of the laser beam corresponding to the pupil diameter of the objective lens on the liquid crystal panel is set to be "D1" and the diameter of the center part is set to be "D2", the (D2/D1) is set to be at a value in the range from about 0.5 to about 0.65. In accordance with an embodiment of the present invention, the outer peripheral divided parts preferably comprise eight sections divided by an approximately equal angle around the center part. Alternatively, the outer peripheral part may be divided into, for example, seven sections or nine or more sections. Further, all the outer peripheral divided parts are not required to be divided by one equal angle and may be divided by different angles.

In accordance with an embodiment of the present invention, the transparent electrode for constructing the aberration compensating device includes a center part in an approximately circular shape and an outer peripheral part surrounding the center part, and the outer peripheral part includes eight outer peripheral divided parts which are divided by an approximately equal angle around the center part. Further, when the diameter of an incident area of the laser beam corresponding to the pupil diameter of the objective lens on the liquid crystal panel is set to be "D1" and the diameter of the center part is set to be "D2", the (D2/D1) is set to be at a value in the range from about 0.5 to about 0.65. In other words, when the relative diameter of the incident area of the laser beam corresponding to the pupil diameter of the objective lens on the liquid crystal panel is set to be "1", the relative diameter of the center part is set to be in the range from about 0.5 to about 0.65. According to the construction described above, the astigmatism different in the direction and magnitude generated in the optical system of an optical head device can be effectively compensated by the aberration compensating device.

In accordance with an embodiment of the present invention, the (D2/D1) is preferably set to be at a value in the range from about 0.52 to about 0.6. In this case, the astigmatism can be further effectively compensated.

In accordance with an embodiment of the present invention, it is preferable that the applied voltage, which is respectively applied to the center part and the outer peripheral divided parts, is capable of being independently set. According to the construction described above, the compensation of the astigmatism can be performed by independently setting the applied voltage respectively with respect to the center part and the respective outer peripheral divided parts. Therefore, the degree of freedom of compensation patterns for the aberration is improved and the compensation can be performed corresponding to the various distributions of astigmatism.

In accordance with an embodiment of the present invention, there is provided an optical head device including the above-mentioned aberration compensating device and an optical system having at least an objective lens for converging a laser beam emitted from a light source on an optical recording disk. The optical system is structured such that the laser beam emitted from the light source passes through the aberration compensating device.

In the optical head device in accordance with an embodiment of the present invention, since the optical system is structured such that the laser beam emitted from the light source passes through the aberration compensating device, the astigmatism generated in the optical system can be effectively compensated.

As described above, in the aberration compensating device in accordance with an embodiment of the present invention, when the relative diameter of the incident area of the laser beam corresponding to the pupil diameter of the objective lens on the liquid crystal panel is set to be "1", the relative diameter of the center part is set to be a value in the range from about 0.5 to about 0.65. Therefore, the astigmatism different in the direction and magnitude generated in the optical system of the optical head device can be effectively compensated with a simple structure.

Further, in the optical head device in accordance with an embodiment of the present invention, the optical system is structured such that the laser beam emitted from the light source passes through the aberration compensating device, and thus the astigmatism generated in the optical system can be effectively compensated. Therefore, the performance of recording and reproduction in the optical head device can be enhanced.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

An embodiment of the present invention will be described below with reference to the accompanying drawings.

Figure 1:
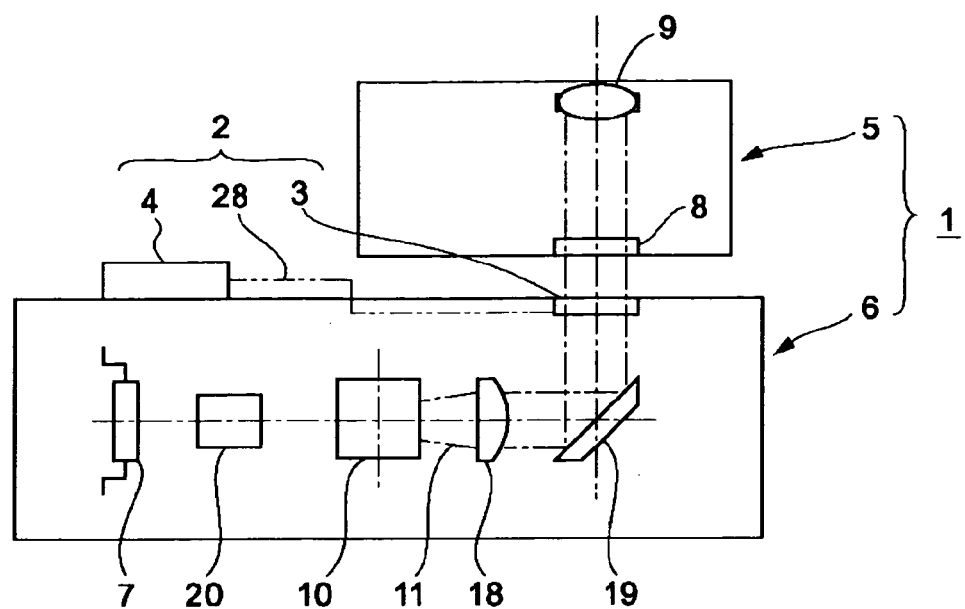
FIG. 1(a) is an explanatory side view showing a schematic structure of an optical head device in accordance with an embodiment of the present invention and FIG. 1(b) is an explanatory view showing a schematic structure of the optical head device viewed from its bottom side.
Figure 1:
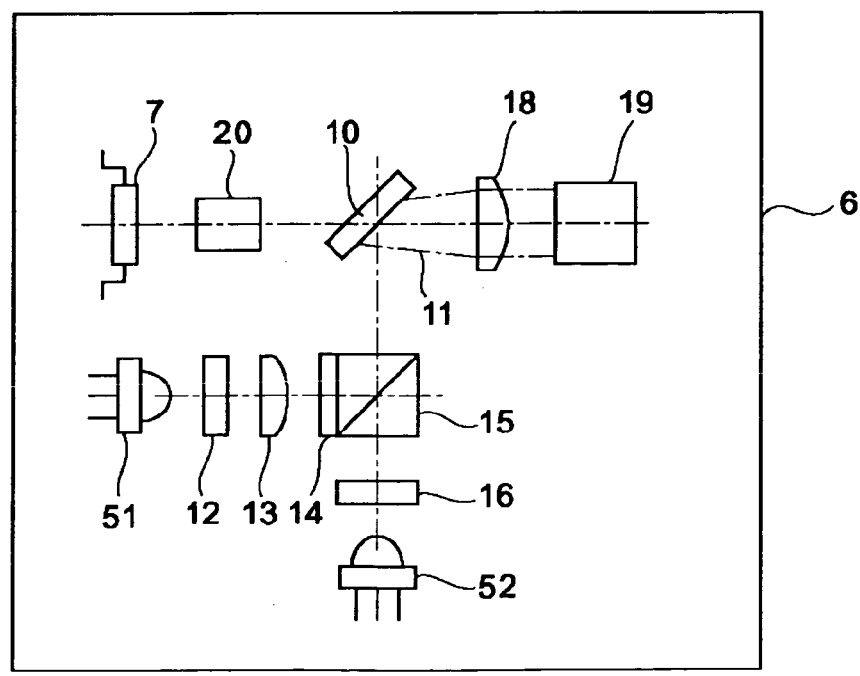

FIG. 1(a) is an explanatory side view showing the schematic structure of an optical head device in accordance with an embodiment of the present invention. FIG. 1(b) is an explanatory view showing a schematic structure of the optical head device viewed from its bottom side.

An optical head device 1 shown in FIGS. 1(a) and 1(b) is used to perform recording or reproduction of information into or from an optical recording disk (not shown in the drawings) such as a CD or a DVD. The optical head device 1 includes an objective lens drive device 5 for driving an objective lens 9, which converges an emitted light beam from a first or a second laser diodes 51, 52 as a light source on an optical recording disk, in a tracking direction, a focusing direction and a tilt direction. The optical head device 1 also includes a device frame 6 on which the objective lens drive device 5 is supported on its upper face side and the first and the second laser diodes 51, 52 and an optical system described later and the like are mounted. The first laser diode 51 is a laser diode for a DVD that emits a first laser beam with the wavelength of 650 nm or 635 nm (short wavelength). The second laser diode 52 is a laser diode for a CD that emits a second laser beam with the wavelength of 760–800 nm (long wavelength).

At both end parts of the device frame 6 are formed a guide hole (not shown in the drawing) in a circular shape and a guide part (not shown in the drawing) protruding in a U-shape. The optical head device 1 is capable of moving in a radial direction of an optical recording disk along guide shafts (not shown in the drawing) passing through the guide hole and the guide part.

As shown in FIGS. 1(a) and 1(b), in the optical head device 1 in accordance with an embodiment of the present invention, a first laser beam emitted from the first laser diode 51 and a second laser beam emitted from the second laser diode 52 are respectively guided to a common optical path 11 directing to an optical recording disk by a prism 15, which is a polarizing beam splitter as an optical path synthesis element, and a half mirror 10 as an optical path separating element, to converge on the recording surface of the optical recording disk by an objective lens 9. The return light beam of the laser beam reflected by the optical recording disk is separated from the common optical path 11 by the half mirror 10 and guided to a light receiving element 7.

More concretely, on the device frame 6 are disposed a first grating lens 12, a relay lens 13, a ½ wavelength plate 14, the prism 15, the half mirror 10, a collimator lens 18 and a raising mirror 19 on the optical path directing to the optical recording disk from the first laser diode 51 in this order. Therefore, after the first laser beam emitted from the first laser diode 51 transmits through the first grating lens 12, the relay lens 13 and the ½ wavelength plate 14, the first laser beam is reflected by the prism 15. Then, after a part of the first laser beam is partially reflected by the half mirror 10, the first laser beam is converted into a parallel light beam by the collimator lens 18 and then guided upward by the raising mirror 19.

On the optical path directing to the optical recording disk from the second laser diode 52 are disposed a second grating lens 16, the prism 15, the half mirror 10, the collimator lens 18 and the raising mirror 19 in this order. Therefore, after the second laser beam emitted from the second laser diode 52 transmits through the second grating lens 16, the second laser beam transmits through the prism 15 and then a part of the second laser beam is partially reflected by the half mirror 10. Then, the second laser beam is converted into a parallel light beam by the collimator lens 18 and then guided upward by the raising mirror 19.

A liquid crystal panel 3 constructing an aberration compensating device 2 and a ¼ wavelength plate 8 are disposed between the raising mirror 19 and the objective lens 9 in this order. Therefore, the aberration of the laser beam guided upward by the raising mirror 19 is compensated by means of that the laser beam passes through the liquid crystal panel 3, and then the laser beam is converted into a circularly polarized light by the ¼ wavelength plate 8 and converged on the recording face of the optical recording disk as a light spot by the objective lens 9. At this time, the position of the objective lens 9 in a tracking direction, a focusing direction and a tilt direction is servo-controlled by the objective lens drive device 5.

The return light beam of the laser beam reflected by the optical recording disk passes the optical path in a reverse direction. In other words, the return light beam is guided to the half mirror 10 through the objective lens 9, the ¼ wavelength plate 8, the liquid crystal panel 3, the raising mirror 19, the collimator lens 18 and the light beam transmitted through the half mirror 10 transmits through a sensor lens 20 and reaches the light receiving element 7. The sensor lens 20 is a lens for generating astigmatism in the return light beam of both the laser beams.

Figure 2:
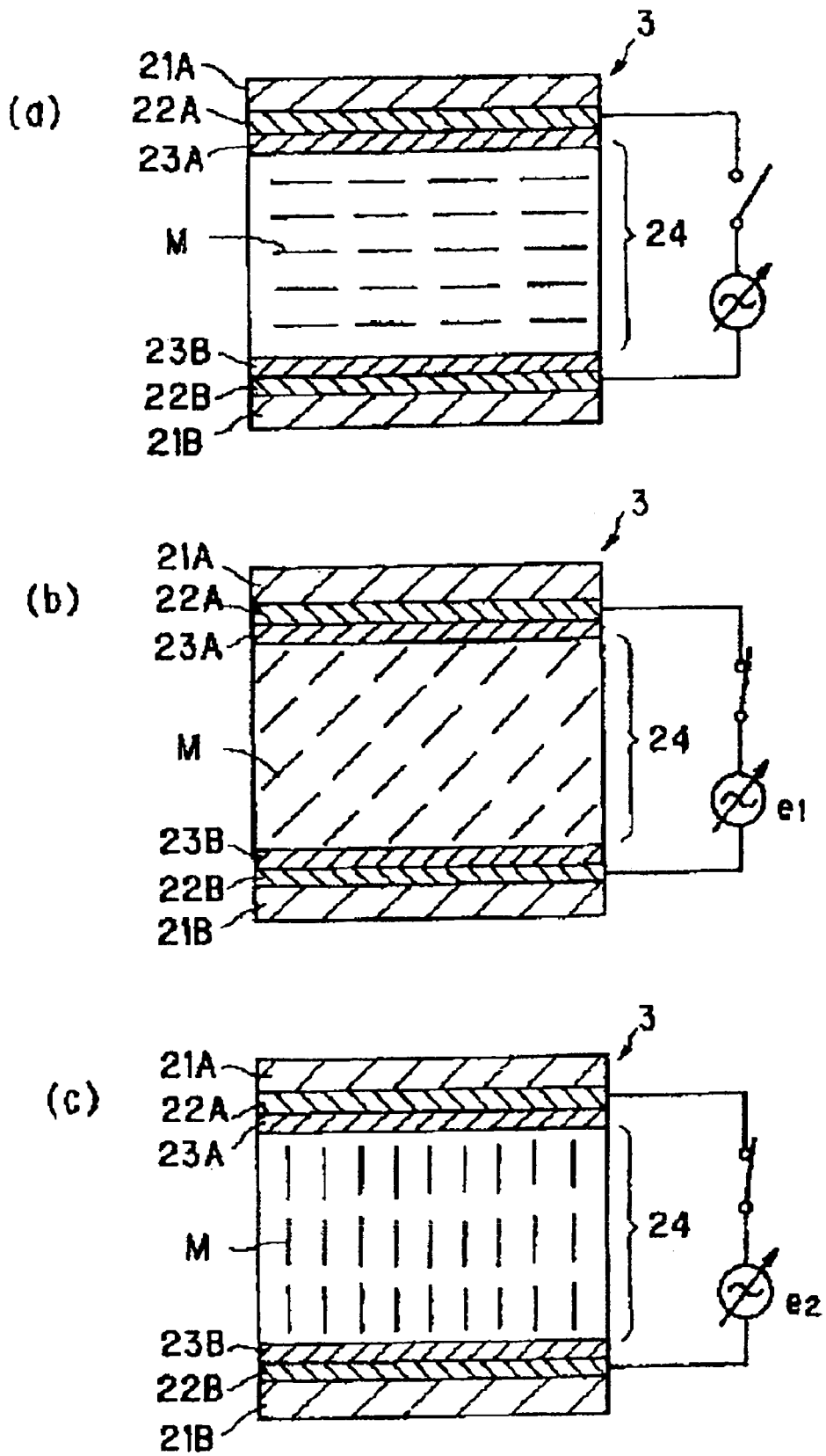
FIGS. 2(a), 2(b) and 2(c) are longitudinal cross-sectional views showing a liquid crystal panel of an aberration compensating device which is used in the optical head device shown in FIGS. 1(a) and 1(b).
Figure 3:
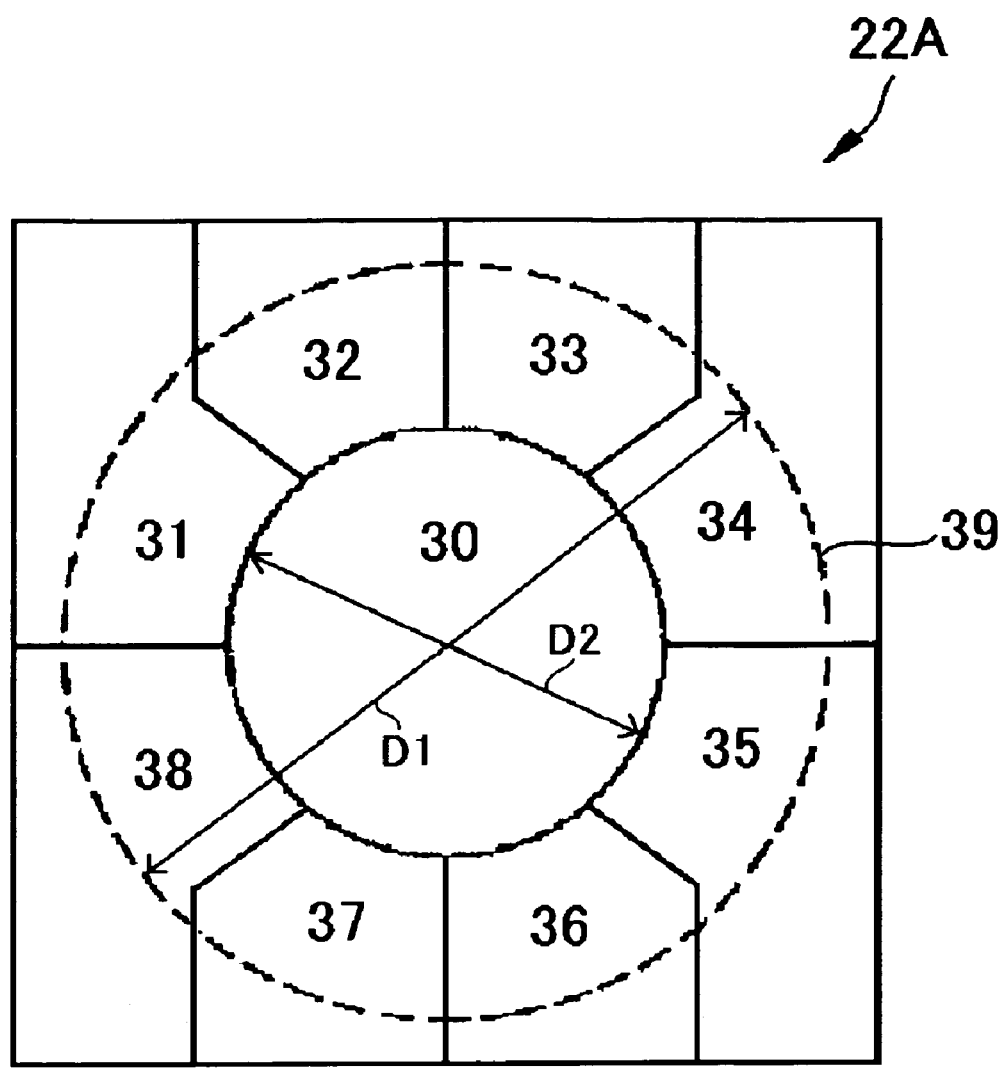
FIG. 3 is a plan view showing a transparent electrode of the liquid crystal panel shown in FIGS. 2(a), 2(b) and 2(c).

FIGS. 2(a), 2(b) and 2(c) are longitudinal cross-sectional views showing the liquid crystal panel of the aberration compensating device which is used in the optical head device shown in FIGS. 1(a) and 1(b). FIG. 3 is a plan view showing the transparent electrode of the liquid crystal panel shown in FIGS. 2(a), 2(b) and 2(c).

As shown in FIG. 1(a), the aberration compensating device 2 in the embodiment of the present invention compensates the aberration of the laser beam which is emitted from the first laser diode 51 or the second laser diode 52 and converged on an optical recording disk through the objective lens 9. The aberration compensating device 2 includes the liquid crystal panel 3, a liquid crystal panel control part 4, and a flexible circuit board 28 electrically connecting the liquid crystal panel 3 to the liquid crystal panel control part 4. The liquid crystal panel 3 and the liquid crystal panel control part 4 are fixed on the upper face side of the device frame 6.

As shown in FIGS. 2(a), 2(b) and 2(c), oriented films 23A, 23B, which give a prescribed molecular orientation property to a liquid crystal layer 24, are disposed in the liquid crystal panel 3 such that the liquid crystal layer 24 whose refractive index is changed depending on an applied voltage is intervened therebetween. Liquid crystal molecules "M" are contained in the liquid crystal layer 24. Transparent substrates 22A, 22B made of ITO (Indium Tin Oxide) or the like are vapor-deposited on the outer side of the oriented films 23A, 23B. Glass substrates 21A, 21B as a protective layer are disposed on the outer side of the transparent substrates 22A, 22 B.

The liquid crystal layer 24 provides a so-called birefringence effect in which the refractive indexes are different from each other in the optic axis direction of the liquid crystal molecule "M" and in the direction perpendicular to the optic axis direction. The direction of the liquid crystal molecule "M" can be freely changed between a horizontal direction and a vertical direction by varying a voltage applied between the transparent substrates 22A and 22B as shown in FIGS. 2(a) through 2(c). An applied voltage to the transparent electrodes 22A, 22B is controlled by the liquid crystal panel control part 4, and a phase difference corresponding to the applied voltage controlled by the liquid crystal panel control part 4 is generated in the laser beam passing through the liquid crystal panel 3.

The transparent electrode 22A is provided with a center part 30 formed in an approximately circular shape and an outer peripheral part surrounding the center part 30 as shown in FIG. 3. The outer peripheral part comprises outer peripheral divided parts 31, 32, 33, 34, 35, 36, 37 and 38 that are divided into eight sections with an approximately equal angle around the center part 30. More concretely, the center part 30 is formed on the liquid crystal panel 3 so as to correspond to the center portion of an incident area 39 of the laser beam that corresponds to the pupil diameter of the objective lens 9. The outer peripheral divided parts 31 through 38 are formed around the center part 30 by being divided with dividing lines extending radially with an approximately equal angle of 45°. The outer peripheral divided parts 31 and 35, 32 and 36, 33 and 37, and 34 and 38 are disposed approximately symmetrically with respect to the center so as to be opposite to each other. The voltages which are applied to the respective divided areas comprising of the center part 30 and the outer peripheral divided parts 31 through 38 can be respectively set independently by the liquid crystal panel control part 4.

In the transparent electrode 22A in accordance with an embodiment of the present invention, when the diameter of the incident area 39 of the laser beam on the liquid crystal panel 3 corresponding to the pupil diameter of the objective lens 9 is set to be "D1" and the diameter of the center part 30 is set to be "D2", the "D2/D1" is set to be at a value in the range from about 0.5 to about 0.65. In other words, when the dimension of the diameter "D1" of the incident area 39 of the laser beam on the liquid crystal panel 3 corresponding to the pupil diameter of the objective lens 9 is set to be "1", the dimension of the diameter "D2" of the center part 30 is set to be a value within the range from about 0.5 to about 0.65. According to the setting described above, the astigmatism generated in the optical system of the optical head device 1 can be further effectively compensated as described later. The structure of the transparent electrode 22B is similar to that of the transparent electrode 22A and thus its description is omitted.

FIGS. 4(a) through 4(d) are explanatory views showing the relationship between the wave front aberration distribution based on the astigmatism generated in the optical system of the optical head device shown in FIGS. 1(a) and 1(b) and a drive pattern for the liquid crystal panel.

Even when the optical systems of optical head devices are structured so as to include the same optical members, the directions and magnitudes of the astigmatisms generated in the optical systems are different from each other in the respective optical head devices. The astigmatism can be compensated by changing the drive pattern for the liquid crystal panel 3. The relationship between the direction of the astigmatism and the drive pattern for the liquid crystal panel 3 will be described later with reference to FIGS. 4(a) through 4(d).

FIG. 4(a) is a view corresponding to the case that the direction of astigmatism (AS angle) is at zero degree (0°). In the longitudinal direction in FIG. 4(a), the wave front aberration is distributed so as to be symmetrically larger in the negative direction toward the peripheral portion from the center and in the transverse direction in the drawing, the wave front aberration is distributed so as to be symmetrically larger in the positive direction toward the peripheral portion from the center. Therefore, in order to compensate the astigmatism, a positive phase difference is applied to the outer peripheral divided parts 32, 33 on the upper side in the drawing and the outer peripheral divided parts 36, 37 on the under side in the drawing. On the other hand, a negative phase difference is applied to the outer peripheral divided parts 31, 38 on the left side in the drawing and the outer peripheral divided parts 34, 35 on the right side in the drawing. In other words, a reference voltage "$V_0$" is applied to the center part 30 of the transparent electrodes 22A, 22B and a larger voltage "$V_+$" than the reference voltage "$V_0$" is applied to the outer peripheral divided parts 32, 33, 36, 37 and a smaller voltage "$V_-$" than the reference voltage "$V_0$" is applied to the outer peripheral divided parts 31, 38, 34, 35. The compensation of the astigmatism is performed by applying the voltages to the respective divided areas as described above.

Figure 4:
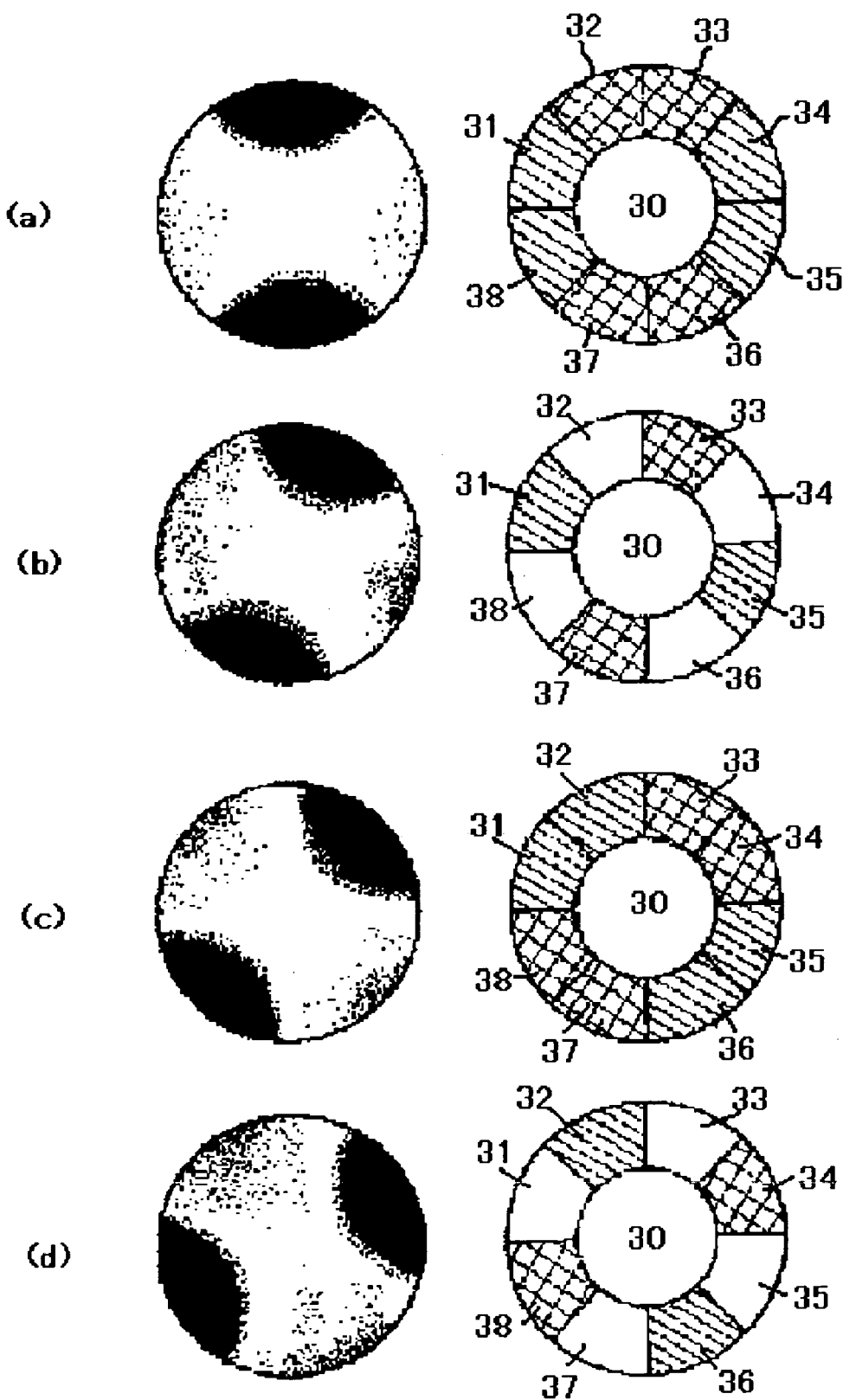
FIGS. 4(a) through 4(d) are explanatory views showing relationships between the wave front aberration distributions based on the astigmatisms generated in the optical system of the optical head device shown in FIGS. 1(a) and 1(b) and the drive patterns for the liquid crystal panel.

FIG. 4(*b*) is a view corresponding to the case that the direction of the astigmatism (AS angle) is at 22.5°. This state is that the direction of the astigmatism is rotated by 22.5° from the state shown in FIG. 4(*a*). In this case, the compensation of the astigmatism is performed by means of that the reference voltage "$V_0$" is applied to the center part 30 of the transparent electrodes 22A, 22B and the larger voltage "$V_+$" than the reference voltage "$V_0$" is applied to the outer peripheral divided parts 33, 37, and the smaller voltage "$V_-$" than the reference voltage "$V_0$" is applied to the outer peripheral divided parts 31, 35.

FIG. 4(*c*) is a view corresponding to the case that the direction of the astigmatism (AS angle) is at 45°. In this case, the compensation of the astigmatism is performed by means of that the reference voltage "$V_0$" is applied to the center part 30 of the transparent electrodes 22A, 22B and the larger voltage "$V_+$" than the reference voltage "$V_0$" is applied to the outer peripheral divided parts 33, 34, 37, 38 and the smaller voltage "$V_-$" than the reference voltage "$V_0$" is applied to the outer peripheral divided parts 31, 32, 35, 36. Further, FIG. 4(*d*) is a view corresponding to the case that the direction of the astigmatism (AS angle) is at 57.5°. In this case, the compensation of the astigmatism is performed by means of that the reference voltage "$V_0$" is applied to the center part 30 of the transparent electrodes 22A, 22B and the larger voltage "$V_+$" than the reference voltage "$V_0$" is applied to the outer peripheral divided parts 34, 38 and the smaller voltage "$V_-$" than the reference voltage "$V_0$" is applied to the outer peripheral divided parts 32, 36.

When the direction of the astigmatism (AS angle) is further changed, the compensation of the astigmatism is performed similarly by changing the drive pattern for the liquid crystal panel 3 as described above. In accordance with the embodiment of the present invention, even when the wave front aberration based on the astigmatism generated in the optical system of the optical head device 1 is distributed in any direction, the astigmatism can be appropriately compensated by driving the closest section of the liquid crystal panel 3 corresponding to the angle divided by 22.5°.

As described above, in the optical head device 1 in accordance with the embodiment of the present invention, the transparent electrodes 22A, 22B constructing the aberration compensating device 2 are provided with the center part 30 formed in an approximately circular shape and the outer peripheral part surrounding the center part 30 and the outer peripheral part comprises outer peripheral divided parts 31, 32, 33, 34, 35, 36, 37 and 38 which are divided into eight sections by an approximately equal angle around the center part 30. Therefore, the compensation of the astigmatism can be appropriately performed by means of that the pattern of the voltage applied to the respective divided areas comprising of the center part 30 and the respective outer peripheral divided parts 31 through 38 is changed, in other words, by means of that the drive pattern for the liquid crystal panel 3 is changed.

Figure 5:
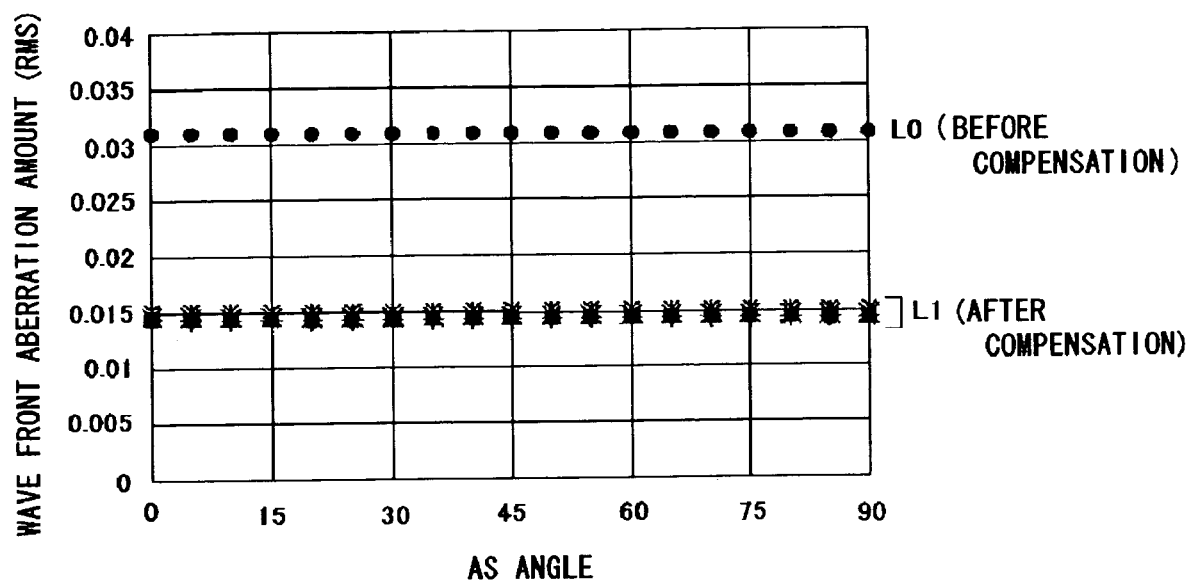
FIG. 5 is a graph in which the quantity of the wave front aberration before compensation and the quantity of the wave front aberration after compensation are compared when the direction of the astigmatism (AS angle) is changed.

For example, as shown in FIG. 5, the wave front aberration amount "L0" before compensation when the direction of the astigmatism (AS angle) is changed can be reduced to the wave front aberration amount "L1" after compensation. Concretely, the wave front aberration amount based on the astigmatism can be reduced to half by using the aberration compensating device 2. In FIG. 5, the direction of the astigmatism (AS angle) is set in a horizontal axis, the wave front aberration amounts before compensation when the AS angle is changed are shown by "L0", and the wave front aberration amounts after compensation at respective AS angles are shown by "L1".

Further, in accordance with the embodiment of the present invention, the ratio (D2/D1) between the diameter "D1" of the incident area 39 and the diameter "D2" of the center part 30 is set to be in the range from about 0.5 to about 0.65. Therefore, the astigmatism different in the direction or magnitude which is generated in the optical system of the optical head device 1 can be further effectively compensated with a simple structure. A concrete example will be described later with reference to FIG. 6.

Figure 6:
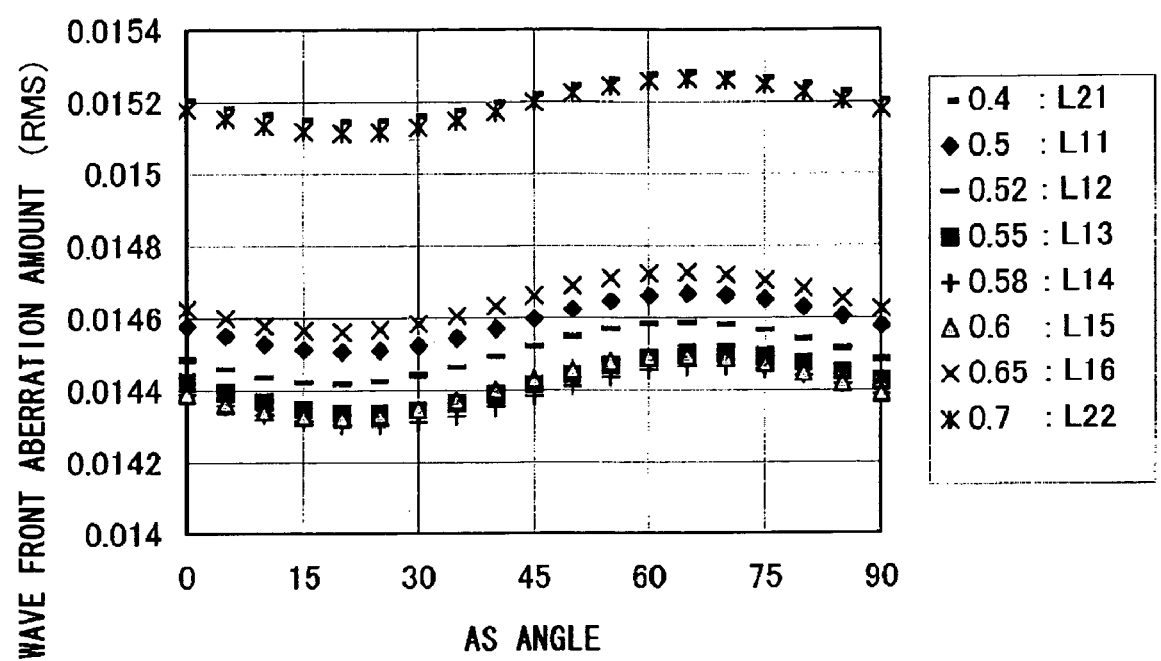
FIG. 6 is an enlarged graph showing the quantity of the wave front aberration after compensation when the direction of astigmatism (AS angle) is changed.

FIG. 6 is an enlarged view showing the wave front aberration amounts "L1" after compensation in FIG. 5. The wave front aberration amounts "L1" through "L16" show the wave front aberration amounts after compensation when the liquid crystal panel 3 in this embodiment of the present invention is used. The wave front aberration amounts "L11" through "L16" show the wave front aberration amounts when the ratios (D2/D1) between the diameter "D1" of the incident area 39 and the diameter "D2" of the center part 30 are respectively set at 0.5, 0.52, 0.55, 0.58, 0.6 and 0.65. The wave front aberration amounts "L21", "L22", which show the comparison examples to the present invention, show the wave front aberration amounts in which the ratios (D2/D1) between the diameter "D1" of the incident area 39 and the diameter "D2" of the center part 30 are set at 0.4 and 0.7.

As shown in FIG. 6, the wave front aberration amounts "L11" through "L16" in this embodiment of the present invention in which the (D2/D1)'s are set to be the values from 0.5 to 0.65 are smaller about 4% or more than the wave front aberration amounts "L21", "L22" in which the (D2/D1) is set at 0.4 or 0.7 described as the comparison examples. Therefore, when the ratio (D2/D1) between the diameter "D1" of the incident area 39 and the diameter "D2" of the center part 30 is set to be a value in the range from about 0.5 to about 0.65, the astigmatism different in the direction or magnitude generated in the optical system of the optical head device 1 can be effectively compensated.

In addition, as shown in FIG. 6, the wave front aberration amounts "L12" through "L15" when the (D2/D1)'s are set to be the values from about 0.52 to about 0.6 are smaller than the wave front aberration amount "L11" or "L16" when the (D2/D1) is set to be at 0.5 or 0.65 although the difference is only equal to or less than 1%. Therefore, a further effective compensation of the astigmatism can be obtained when the ratio (D2/D1) between the diameter D1 of the incident area 39 and the diameter D2 of the center part 30 is set to be the value from about 0.52 to about 0.6.

In the embodiments of the present invention, the voltages applied to the respective divided areas comprising of the center part 30 and the respective outer peripheral divided parts 31 through 38 are capable of being set independently by the liquid crystal panel control part 4. Therefore, the compensation of astigmatisms can be performed by respectively setting applied voltages independently with respect to the center part 30 and the respective outer peripheral divided parts 31 through 38. Accordingly, the degree of freedom of compensation patterns for aberration is improved and the compensation can be performed corresponding to the various distributions of astigmatism.

The present invention has been described in detail using the preferred embodiment, but the present invention is not limited to the embodiment described above and many modifications can be made without departing from the present invention. For example, the structure of the optical system is not limited to the above-mentioned embodiment and the optical system may be constructed such that only one laser diode is used as a light source and the prism 15 is not used. Further, in the optical head device 1 in accordance with the embodiment of the present invention, the transparent electrodes 22A, 22B included in the aberration compensating device 2 are constructed of the center part 30 in an approximately circular shape and the outer peripheral part surrounding the center part 30 and the outer peripheral part is constructed of outer peripheral divided parts which are divided into eight sections by approximately equal angles around the center part 30. However, the outer peripheral part is not limited to be divided into eight sections and may be divided into, for example, seven sections or nine or more sections. Further, the outer peripheral divided parts are not always required to be divided by an equal angle and may be divided by different angles.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An aberration compensating device for compensating aberration of a laser beam which is emitted from a light source and converged on an optical recording disk through an objective lens comprising:
    a liquid crystal panel including a liquid crystal layer whose refractive index is changed in accordance with an applied voltage and transparent electrodes which are disposed so as to interpose the liquid crystal layer therebetween; and
    a liquid crystal panel control part for controlling the applied voltage which is applied to the transparent electrodes;
    wherein at least one of the transparent electrodes includes a center part in an approximately circular shape and an outer peripheral part surrounding the center part, and the outer peripheral part includes a plurality of outer peripheral divided parts which are divided around the center part, and
    when a diameter of an incident area of the laser beam corresponding to a pupil diameter of the objective lens on the liquid crystal panel is set to be "D1" and a diameter of the center part is set to be "D2", (D2/D1) is set at a value in the range 0.5 to 0.65.

2. The aberration compensating device according to claim 1, wherein the (D2/D1) is set at a value in the range 0.52 to 0.6.

3. The aberration compensating device according to claim 1, wherein the voltage is independently set which is respectively applied to the center part and the outer peripheral divided parts.

4. The aberration compensating device according to claim 1, wherein the outer peripheral divided parts comprise eight sections divided by an approximately equal angle around the center part.

5. The aberration compensating device according to claim 1, wherein each of the transparent electrodes includes the center part and the outer peripheral part.

6. An optical head device comprising:
    a light source;
    an objective lens for converging a laser beam emitted from the light source on an optical recording disk; and
    an aberration compensating device which is disposed between the light source and the objective lens for compensating aberration of the laser beam;
    wherein the aberration compensating device comprises;
        a liquid crystal panel including a liquid crystal layer whose refractive index is changed in accordance with an applied voltage and transparent electrodes which are disposed so as to interpose the liquid crystal layer therebetween; and
        a liquid crystal panel control part for controlling the voltage which is applied to the transparent electrodes;
        wherein at least one of the transparent electrodes includes a center part in an approximately circular shape and an outer peripheral part surrounding the center part, and the outer peripheral part includes a plurality of outer peripheral divided parts which are divided around the center part, and
        when a diameter of an incident area of the laser beam corresponding to a pupil diameter of the objective lens on the liquid crystal panel is set to be "D1" and a diameter of the center part is set to be "D2", (D2/D1) is set at a value in the range 0.5 to 0.65.

7. The optical head device according to claim 6, wherein the (D2/D1) is set at a value in the range 0.52 to 0.6.

8. The optical head device according to claim 6, wherein the voltage is independently set which is respectively applied to the center part and the outer peripheral divided parts.

9. The optical head device according to claim 6, wherein the outer peripheral divided parts comprise eight sections divided by an approximately equal angle around the center part.

10. The optical head device according to claim 6, wherein each of the transparent electrodes includes the center part and the outer peripheral part.

* * * * *